United States Patent [19]

Apotheker et al.

[11] 4,035,565

[45] July 12, 1977

[54] FLUOROPOLYMER CONTAINING A SMALL AMOUNT OF BROMINE-CONTAINING OLEFIN UNITS

[75] Inventors: David Apotheker; Paul Joseph Krusic, both of Wilmington, Del.

[73] Assignee: E. I. Du Pont de Nemours and Company, Wilmington, Del.

[21] Appl. No.: 562,648

[22] Filed: Mar. 27, 1975

[51] Int. Cl.² .................................... C08F 214/16
[52] U.S. Cl. ........................... 526/249; 526/18; 526/47; 526/50; 526/57; 526/247
[58] Field of Search ....... 260/80.77, 80.76, 87.5 A; 526/247, 249

[56] References Cited

U.S. PATENT DOCUMENTS

| | | | |
|---|---|---|---|
| 2,833,752 | 5/1958 | Honn et al. | 260/87.7 |
| 2,944,995 | 7/1960 | Dosmann et al. | 260/41 |
| 2,958,672 | 11/1960 | Goldberg | 260/45.5 |
| 2,965,619 | 12/1960 | Honn | 260/79.5 |
| 3,011,995 | 12/1961 | Smith | 260/41 |
| 3,053,818 | 10/1962 | Honn et al. | 260/80.77 |
| 3,163,628 | 12/1964 | Bolstad | 260/80.77 |
| 3,178,399 | 4/1965 | Lo | 260/80.77 |
| 3,318,854 | 5/1967 | Honn | 526/249 |
| 3,654,210 | 4/1972 | Kuhls et al. | 260/29.6 F |
| 3,707,529 | 12/1972 | Gladding et al. | 260/80.77 |

FOREIGN PATENT DOCUMENTS

36,229  12/1973  Japan

*Primary Examiner*—Paul R. Michl

[57] ABSTRACT

A novel fluoropolymer can be made by copolymerizing a small amount (e.g. about 0.5–3 mole %) of bromotrifluoroethylene or bromotetrafluorobutene with certain combinations of monomers comprising selected fluorine-containing compounds. A fluoropolymer composition useful in the manufacture of cured fluoropolymer articles can be made by mixing the resulting fluoropolymer or a closely related fluoropolymer with an organic peroxide such as a dialkyl peroxide, and preferably also adding a divalent metal oxide and/or hydroxide and a suitable coagent such as triallyl isocyanurate.

12 Claims, No Drawings

FLUOROPOLYMER CONTAINING A SMALL AMOUNT OF BROMINE-CONTAINING OLEFIN UNITS

BACKGROUND OF THE INVENTION

This invention relates to fluoropolymers including non-elastomeric fluoropolymers and elastomeric fluoropolymers (fluoroelastomers). The invention also relates to fluoro-polymer compositions which are useful in the manufacture of cured fluoropolymer articles.

In the industries which manufacture and use fluoroelastomers and fluoropolymer plastics, there is a need for polymeric materials of this type which are easy and economical to cure (cross-link or vulcanize). This is especially true in applications where it is desired to obtain a product having good resistance to damage by heat, solvents, and/or corrosive chemicals. Good creep-resistance is also often important.

SUMMARY OF THE INVENTION

The present invention provides a novel fluoropolymer which is a copolymer whose interpolymerized units consist essentially of a. up to 3 mole %, based on the total moles of components (a) and (b), of units derived from a compound selected from the group: bromotrifluoroethylene and 4-bromo-3,3,4,4-tetrafluorobutene-1, with the proviso that enough of such units are present to provide at least 0.05 weight % bromine in the copolymer, and b. enough units derived from component (b-1), (b-2) or (b-3) as follows to make up the remainder of the copolymer:

b-1. tetrafluoroethylene and a perfluoroalkyl perfluorovinyl ether wherein the alkyl group contains 1-5 carbon atoms, b-2. about 45-65 mole % of tetrafluoroethylene, about 20-55 mole % of a $C_2$-$C_4$ olefinic hydrocarbon and from 0 to about 30 mole % vinylidene fluoride, or b-3. vinylidene fluoride, at least one fluorine-containing olefin copolymerizable therewith, and optionally said perfluoroalkyl perfluorovinyl ether, said olefin being a compound which contains 2-7 carbon atoms, contains no bromine atom, and contains at least as many fluorine atoms as carbon atoms.

The invention also provides a fluoropolymer composition which comprises

A. a copolymer whose interpolymerized units consist essentially of 1. up to 3 mole % of units derived from a bromine containing olefin with the proviso that enough of such units are present to provide at least 0.05 weight % bromine in the copolymer, and 2. enough units derived from component (2.1) or (2.2) as follows to make up the remainder of the copolymer:

2.1. at least one fluorine-containing monomer which is copolymerizable with component (1), contains 2-7 carbon atoms, contains no bromine atom, and contains at least as many fluorine atoms as carbon atoms, or 2.2. about 50-99 mole % of tetrafluoroethylene, about 1-50 mole % of a $C_2$-$C_4$ olefinic hydrocarbon and from 0 to about 30 mole % of vinylidene fluoride, and B. about 0.5-10% of an organic peroxide based on the weight of component (A).

Description of Preferred Embodiments

Regarding the novel fluoropolymer described above, it is often preferred that enough of the component (a) units are present in the copolymer to provide about 0.3-1.5 weight % bromine in the copolymer. An especially preferred component (a) compound is bromotrifluoroethylene. It will be noted that items (a) and (b) are components in the sense that they are ingredients (in copolymerized form) of the fluoropolymer.

In some of the most useful embodiments of the invention, the novel copolymer is a fluoroelastomer wherein component (b) is composed of units derived from about 50-80 mole % tetrafluoroethylene and about 20-50 mole % perfluoroalkyl perfluorovinyl ether. Thus, a monomer combination referred to in the Summary as (b-1) is used to make this copolymer. Said ether compound is preferably perfluoromethyl perfluorovinyl ether.

In other highly useful embodiments, the copolymer is a fluoropolymer (preferably a fluoroelastomer) wherein component (b) is composed of units derived from any one of the following three combinations:

vinylidene fluoride and hexafluoropropylene or pentafluoropropylene;

vinylidene fluoride, tetrafluoroethylene and hexafluoropropylene or pentafluoropropylene; or vinylidene fluoride, said perfluoroalkyl perfluorovinyl ether, and at least one member of the group: hexafluoropropylene and tetrafluoroethylene. Thus, in making this class of copolymers, one uses a monomer combination within what is referred to in the Summary as (b-3). In such embodiments, component (b) can, for example, be composed of about 30-70% vinylidene fluoride units and about 30-70% hexafluoropropylene units (units derived from these compounds) based on the weight of component (b). Or, component (b) can be composed of about 25-70 weight % vinylidene fluoride units, about 19-60 weight % hexafluoropropylene units and about 3-35 weight % tetrafluoroethylene units. Or component (b) can be composed of units derived from (on a weight % basis) about 4-15% of tetrafluoroethylene, about 48-65% of vinylidene fluoride, about 8-23% of hexafluoropropylene and about 17-30% of a perfluoroalkyl perfluorovinyl ether wherein the alkyl group contains 1-5 carbon atoms. Or component (b) can be composed of units derived from (on a mole % basis) about 10-85% vinylidene fluoride about 2-50% of said perfluoroalkyl perfluorovinyl ether and about 3-80% of a component consisting of one or more of the following: hexafluoropropylene and tetrafluoroethylene. One can also use chlorotrifluoroethylene as the fluorine-containing olefin of component (b-3).

To illustrate preferred embodiments of the monomer combination referred to above in the summary as (b-2), the copolymer can be a fluoroelastomer wherein component (b) is composed of about 45-55 mole % of tetrafluoroethylene units and about 45-55 mole % of propylene units. Or wherein component (b) is composed of about 50-65 mole % of tetrafluoroethylene units, about 5-26 mole % of vinylidene fluoride units and about 20-45 mole % of propylene units. In the latter, the propylene can be replaced with any of the following: butene-1, a mixture of about 0.1–50 mole % of ethylene or isobutylene and about 50–99.9 mole % of propylene or butene-1, and a mixture of about 50 mole % of ethylene and 50 mole % of isobutylene.

In preparing the present fluoropolymer, it is preferred that the reaction mixture of monomer components also contains a free-radical initiator, and the copolymer-forming reaction is carried out as a free radical emulsion polymerization reaction. Among the most useful free-radical initiators to use in such a reaction are ammonium persulfate, sodium persulfate, potassium persulfate, or a mixture of two or more such compounds. Also useful are other water-soluble inorganic peroxide compounds, for example sodium, potassium, and ammonium perphosphates, perborates, and percarbonates. The initiator can be used in combination with a reducing agent such as sodium, potassium, or ammonium sulfite, bisulfite, metabisulfite, hyposulfite, thiosulfate, phosphite, or hypophosphite, or in combination with a ferrous, cuprous, or silver salt, or other easily oxidized metal compound. Known organic free-radical intiators can also be used, preferably in combination with a suitable surfactant such as sodium lauryl sulfate or ammonium perfluorooctanoate. The surfactant can be selected from those known to be useful in the manufacture of fluoropolymers. A surfactant can of course also be present when using an inorganic initiator. A suitable known chain transfer agent can also be present during the emulsion polymerization reaction, but in many cases this is not preferred.

After completion of the preferred emulsion polymerization reaction, the copolymer can be isolated from the resulting polymer latex by known methods, for example by coagulation by adding an electrolyte or by freezing, followed by centrifuging or filtering and then drying the copolymer.

The copolymer-forming reaction can also be carried out in bulk, or in an organic liquid containing an organic free-radical initiator. It is usually preferred than none of the organic liquid present is a chain transfer agent.

During preparation of the copolymer, the reaction mixture is preferably heated in a reactor which has been flushed with an inert gas at about 50°–130° C. under superatmospheric pressure, for example under a pressure of about 7–140 kg./cm.$^2$, preferably about 35–105 kg./cm.$^2$. In some of the most useful procedures, the polymerization is carried out as a continuous process and the reaction mixture has an average residence time in the reactor of about 5 to 30 minutes in some cases and up to 2 or 3 hours in others. Residence time can be calculated by dividing the reactor volume by the volume of latex produced per hour.

The novel fluoropolymer in the majority of cases will have an inherent viscosity of about 0.01 or higher, with special preference for an inherent viscosity of about 0.2–1.2. Inherent viscosity of some of the fluoropolymers can be measured at 30° C at a copolymer concentration of 0.1% by weight in a solvent composed of 87% by volume of tetrahydrofuran and 13% by volume of N,N-dimethylformamide. A test method using a different solvent is described below in Example 1.

One skilled in the art will have no difficulty in preparing various fluoropolymers useful in the practice of the present invention. For example, he will realize after reading the present disclosure that substantially the same polymer-forming methods can be used as are described by Rexford in U.S. Pat. No. 3,051,677, by Pailthorp and Schroeder in U.S. Pat. No. 2,968,649, by Sianesi et al. In U.S. Pat. No. 3,331,823 and U.S. Pat. No. 3,335,106, by Albin and Gallagher in U.S. Pat. No. 3,235,537, by Brasen and Cleaver in U.S. Pat. No. 3,467,635 and by other inventors whose patents concern the preparation of fluorpolymers.

Regarding the fluoropolymer composition described above in the Summary, the copolymers described above as being especially useful or preferred are among the preferred fluoropolymers to be used in the present composition. The bromine-containing olefin used to form the units of component (1) in the copolymer of this composition is preferably bromotrifluoroethylene or 4-bromo-3,3,4,4-tetrafluorobutene-1, or a blend of these two compounds. The term "bromine-containing olefin" herein means an olefin in which at least one hydrogen atom has been replaced with a bromine atom, and optionally one or more of the remaining hydrogen atoms have been replaced with an atom of another halogen, preferably fluorine. Some compounds of this type are available commercially and others can be prepared by methods known in the art, for example as shown by Tarrant and Tunden in 34 J. Org. Chem. 864 (1969) and by Fainberg and Miller in 79 JACS 4170 (1957). Other bromine-containing olefins besides the two already mentioned which are copolymerizable with the monomers used to form the component (2) units of the copolymer, and useful to form the component (A-1) units, are illustrated as follows: vinyl bromide, 1-bromo-2,2-difluoroethylene, perfluoroallyl bromide, 4-bromo-1,1,2-trifluorobutene, 4-bromo-1,1,3,3,4,4-hexafluorobutene, 4-bromo-3-chloro-1,1,3,4,4,-pentafluorobutene, 6-bromo-5,5,6,6-tetrafluorohexene, 4-bromoperfluorobutene-1, and 3,3-difluoroallyl bromide.

It is usually preferred that enough of the component (A-1) units are present to provide about 0.3–1.5 weight % bromine in the copolymer.

As shown in the Summary, the component (2) units of the copolymer (A) used in the composition can be derived from a specified type of fluorine-containing monomer (referred to for the sake of convenience as component 2.1); or the component (2) units can be derived from a specified blend (referred to as component 2.2) of tetrafluoroethylene, an olefinic hydrocarbon and optionally vinylidene fluoride.

In a preferred embodiment of the composition, component 2.1 is composed of units derived from tetrafluoroethylene and perfluoroalkyl perfluorovinyl ether wherein the alkyl group contains 1–5 carbon atoms. Said ether is preferably perfluoromethyl perfluorovinyl ether. In some of the best illustrations of this type of composition, the fluoropolymer is a fluoroelastomer wherein the tetrafluoro-ethylene content of component 2.1 is about 50–80 mole % and the ether content is about 20–50 mole %.

In another preferred embodiment of the composition component 2.1 is composed of units derived from vinylidene fluoride, at least one fluorine-containing olefin copolymerizable therewith, and optionally a perfluoroalkyl perfluorovinyl ether wherein the alkyl group contains 1–5 carbon atoms. It is especially preferred in this type of composition that the fluoropolymer is a fluoroelastomer wherein component 2.1 is composed of units derived from any one of the following three combinations:

vinylidene fluoride and hexafluoropropylene or pentafluoropropylene;

vinylidene fluoride, tetrafluoroethylene and hexafluoropropylene or pentafluoropropylene; or vinylidene fluoride, said perfluoroalkyl perfluorovinyl ether, and at least one member of the group: hexafluoropropylene and tetrafluoroethylene.

For example, component 2.1 of one such fluoroelastomer is composed of about 30–70 weight % vinylidene fluoride units and about 30–70 weight % of hexafluoropropylene units. Another such fluoroelastomer has component 2.1 composed of about 25–70 weight % vinylidene fluoride units, about 19–60 weight % hexafluoropropylene units and about 3–35 weight % tetrafluoroethylene units. Monomer combinations useful as component 2.1 in other such fluoroelastomers are described above in the discussion of component (b-3) of the novel fluoropolymer. Component 2.1 can also be composed of tetrafluoroethylene alone or vinylidene fluoride alone in applications wherein it is not necessary that the fluoropolymer be a fluoroelastomer.

As already mentioned, the component (2) units of the copolymer of the present composition can also be derived from the specified blend (tetrafluoroethylene, olefinic hydrocarbon and optionally vinylidene fluoride) referred to as component (2.2). For example, component 2.2 can be composed of (units derived from) about 50–99 mole % tetrafluoroethylene and about 1–50 mole % propylene. Component 2.2 can also be composed of about 1–30 mole % vinylidene fluoride units, about 50–98 mole % tetrafluoroethylene and about 1–48 mole % propylene.

Component B of the present composition is an organic peroxide, preferably a dialkyl peroxide. An organic peroxide is selected which will function as a curing agent for the composition in the presence of the other ingredients which are to be present in the end-use composition and under the temperatures to be used in the curing operation without causing any harmful amount of curing during mixing or other operations which are to precede the curing operation. A dialkyl peroxide which decomposes at a temperature above 49° C is especially preferred when the composition is to be subjected to processing at elevated temperatures before it is cured. In many cases one will prefer to use a di-tertiarybutyl peroxide having a tertiary carbon atom attached to a peroxy oxygen. Among the most useful peroxides of this type are 2,5-dimethyl-2,5-di(-tertiarybutylperoxy) hexyne-3 and 2,5-dimethyl-2,5-di(tertiarybutylperoxy) hexane. Component B can also be selected from such compounds as dicumyl peroxide, dibenzoyl peroxide, tertiary butyl perbenzoate and di[1,3-dimethyl-3-(t-butylperoxy)butyl]carbonate and the like.

To illustrate an application where one can use a component B compound which decomposes at or below 49° C, one can carry out the steps of preparing the composition at room temperature as a liquid film-forming composition containing an organic solvent and/or diluent, applying a layer of the liquid composition to a substrate, and allowing the layer to become dried and cured at or below 49° C.

One will usually prefer to employ a component B peroxide content of about 1.5–5% based on the weight of the component A copolymer.

The present composition in the form of a blend of the component A copolymer and the component B peroxide is a useful article of commerce which (as in the case of a novel polymer) can be supplied to manufacturers of fabricated fluoropolymer articles who wish to modify the material with certain additives according to the requirements of particular applications before it is molded, extruded or otherwise made into cured end-products. Another useful approach is for the supplier of the composition to add one or both of components C and D described below before the composition is delivered to the person who makes the cured products.

One material which is usually blended with the composition before it is made into end products is at least one metal compound selected from divalent metal oxides and divalent metal hydroxides. This material can be referred to as component (C). A metal salt of a weak acid can be used along with the oxide and/or hydroxide. Component (C) is added in an amount equal to about 1–15%, preferably about 2–10%, by weight of the copolymer content. Metal compounds useful as component (C) are further described by Bowman in U.S. Pat. No. 3,686,143.

Another material which is usually blended with the composition before it is made into end products is a coagent composed of a polyunsaturated compound which is capable of cooperating with said peroxide to provide a useful cure. This material, which can be referred to as component (D), is added in an amount equal to about 0.5–10%, preferably about 1–7%, by weight of the copolymer content. It is preferred in many applications to use as a component (D) coagent one or more of the following compounds: triallyl cyanurate; triallyl isocyanurate; tris(diallylamine)-s-triazine; triallyl phosphite, N,N-diallyl acrylamide; hexaallyl phosphoramide; N,N,N',N'-tetra-allyl tetephthalamide; N,N,N'N'-tetra-allyl malonamide; trivinyl isocyanurate; 2,4,6-trivinyl methyltrisiloxane; and tri(5-norbornene-2-methylene)cyanurate; and the like. Particularly useful is triallyl isocyanurate.

The composition can also contain one or more additives such as those known to be useful in fluoropolymer compositions, for example pigments, fillers, pore-forming agents and liquid organic solvents. An example of a useful type of solvent is the one described by Proskow in U.S. Pat. No. 3,740,369. Others include acetone, methyl ethyl ketone, ethyl acetate, amyl acetate, tetrahydrofuran and the like. By adding a suitable solvent, one can prepare a liquid composition useful in the preparation of adhesive layers, coatings, films and the like.

In preparing the present fluoropolymer composition, one can mix the copolymer with the other ingredients by means of any mixing apparatus known to be useful for preparing rubber or plastic compositions; for example, one can use a roller-type mill or Banbury mixer equipped to operate at a temperature below the decomposition temperature of the organic peroxide.

The composition can be cured by subjecting it to conditions which result in the decomposition of the organic peroxide, for example by heating the composition at a temperature which causes the peroxide to decompose. The initial curing of the curable composition containing components A, B, C and D in most cases is preferably carried out by heating the composition for about 1–60 minutes at about 149°–204° C; conventional rubber- and plastic-curing presses, molds, extruders, and the like provided with suitable heating and curing means can be used. Also, if one wants a product having maximum heat resistance and dimensional stability, it is preferred to carry out a post-curing operation wherein the article is heated in an oven or the like for an additional period of about 1–48 hours at about 180°-300° C. One skilled in the art will realize that the best curing time and temperature for a particular application will depend on such factors as the nature and proportion of ingredients and the properties needed in the final product.

Fluoropolymer plastics and elastomers, and compositions containing them, can easily be made in accordance with the present invention in vulcanizable grades suitable for compounding and curing by practical and economical methods to yield highly useful cured fluoropolymer plastic and elastomer articles for applications such as films, gaskets, O-rings, coated fabrics, wire insulation, hoses, protective coatings and the like, which have good creep-resistance and good resistance to damage by heat, solvents and corrosive chemicals. Moreover, one can prepare fluoropolymers for use in the present composition from a wide variety of fluorine-containing monomers to obtain properties in the cured plastic and elastomer articles suited for a wide variety of applications.

To illustrate the beneficial utility of the present products further, fluoropolymers are obtainable within the present invention: (a) which can be cured rapidly; (b) which can be cured at atmospheric pressure to a nonporous or non-spongy structure, an important advantage in the manufacture of fluoropolymer-coated wire, fluoropolymer hose and the like; (c) which can be at about ordinary room temperatures; (d) which undergo a surprisingly great increase in torque during the ODR cure test described below, which is desirable in many applications; (e) which have lower (more useful) compression set values after curing than prior art diamine-cured fluoroelastomers (this applies to certain fluoroelastomer compositions of the present invention wherein the fluoroelastomer is a vinylidene fluoride copolymer) and (f) which can be cured with less tendency to undergo polymer degradation than certain prior art fluoroelastomer materials cured with a blend of aromatic hydroxy compound and quaternary phosphonium compound of the type shown by Patel el al. in U.S. Pat No. 3,712,877 (This applies to certain fluoroelastomer compositions of this invention wherein the fluoroelastomer is a vinylidene fluoride copolymer containing units derived from a perfluoroalkyl perfluorovinyl ether).

The following examples illustrate the invention; all amounts are by weight unless otherwise indicated.

EXAMPLE 1

A curable fluoropolymer of this invention in the form of an elastomeric copolymer of tetrafluoroethylene, perfluoromethyl perfluorovinyl ether and bromotrifluoroethylene is prepared by a continuous process composed of the following operations:

1. Continuously feeding the three monomers described below in Table I to a 3.8 liter stainless steel pressure vessel reactor (polymerization reaction zone) which had been flushed with nitrogen, while operating the stirrer of the reactor at 500 rpm for thorough mixing of the reactor contents, and while the contents of the reactor are heated at 70° C, under a pressure of 42 kg./cm.$^2$ so that the reaction mixture formed in operation (2) below will undergo an emulsion polymerization reaction as it passes through the reactor, the reactor residence time being about 2.7 hours based on the ratio of the 3.8 liter reactor to the emulsion output rate of about 1.4 liters per hour, the monomers and the feed rate for each being as shown below in Table I;

2. During operation 1, constantly feeding to the reactor through a first metering pump during each hour a solution composed of 6.38 grams of ammonium persulfate, 4.5 grams of dibasic sodium phosphate heptohydrate and 12.0 grams of ammonium perfluoro octanoate dissolved in 600 ml. of water (distilled), and simultaneously feeding to the reactor through a second metering pump during each hour a solution composed of 5.25 grams of sodium sulfite dissolved in 600 ml. of water, the reaction mixture being maintained at a pH of 6.1;

3. Continuously removing from the reactor the resulting copolymer latex which is continuously formed during operations 1 and 2, the latex being passed first through a back-pressure regulating valve set to maintain the desired reactor pressure of 42 kg./cm.$^2$, and then through a sealed container from which the off-gas (unreacted monomers) is led to a gas chromatograph where its composition is determined and recorded in Table I below;

4. After discarding the latex obtained during the first four residence times, collecting the desired quantity of latex and mixing it for uniformity, the latex having a pH of about 6.1 and a copolymer solids content of 26.0%; and 5. Isolating the resulting copolymer from the latex by the gradual addition of a 4% aqueous solution of potassium aluminum sulfate until the copolymer is coagulated, washing the copolymer particles with distilled water, removing the water by means of a filter apparatus, and then drying the copolymer in a circulating air-oven at 100° C to a moisture content of less than 1%.

Table I

| Monomer | Feed g./hr. | Off-Gas g./hr. | Incorporated in Polymer | | |
|---|---|---|---|---|---|
| | | | g./hr. | Wt.% | Mole% |
| Tetrafluoroethylene | 260 | 14 | 246 | 56.0 | 68.5 |
| Perfluoromethyl perfluorovinyl ether | 300 | 117 | 183 | 41.6 | 30.0 |
| Bromotrifluoroethylene | 10 | 1 | 9 | 2.4 | 1.5 |
| Total | 570 | 132 | 438 | | |

The resulting copolymer is an elastomer which can be cured in the manner described below in Example 2; as indicated in Table I above, it contains in each 100 grams of polymerized units about 56 grams of polymerized tetrafluoroethylene, 41.6 grams of polymerized perfluoromethyl perfluorovinyl ether and 2.4 grams of bromotrifluoroethylene. The copolymer has an inherent viscosity of 0.38; this property is measured at 30° C at a polymer concentration of 0.2% by weight in a solvent composed of 58% by volume of 2,3,3-trichloroperfluorobutane, 39% by volume of "FC-75" solvent and 3% by volume of diethylene glycol dimethyl ether. The FC-75 solvent is a perfluoro cyclic ether type of solvent of the empirical formula $C_8F_{16}O$, sold under the 3M Company trade name FC-75, and described in further detail in the above-mentioned Proskow U.S. Pat. No. 3,740,269. In place of this solvent one can use the product of fluorinating tetrahydrofuran until one obtains a solvent composed predominantly of 2-perfluorobutyl perfluorotetrahydrofuran. The copolymer has a bromine content of 1.2% by weight; and it is insoluble in aliphatic and aromatic hydrocarbons. The copolymer can be blended with additives in the manner described in Example 2 and used in the manufacture of O-rings and other cured elastomer articles.

One skilled in the art, after reading the present disclosure, will have no difficulty in preparing other copolymers of the present invention in a similar manner to that described in Example I when using other proportions of the same three monomers.

EXAMPLE 2

A curable fluoroelastomer is prepared by repeating Example 1 except the monomer feed rate is adjusted so that a copolymer is obtained which contains 65.0 mole % of tetrafluoroethylene units, 33.5 mole % of perfluoromethyl perfluorovinyl ether units and 1.5 mole % of bromotrifluoroethylene units. The resulting Example 2 copolymer has the same bromine content and inherent viscosity as the Example 1 copolymer.

A curable fluoroelastomer composition is prepared by mixing the following ingredients on a two-roll rubber mill whose rolls are at about 60° C: 100 parts of the Example 2 copolymer, 10 parts of carbon black (SAF), 4 parts of magnesium oxide, 2 parts of calcium oxide, 4 parts of triallyl isocyanurate and 4 parts of peroxide curing agent (45% of 2,5-dimethyl-2,5-di(ditertiarybutylperoxy)hexyne-3 and 55% inert filler, sold by Wallace and Tiernan as "Luperco 130 XL").

A sample of the resulting composition is used for measuring curing characteristics by means of the ODR (oscillating disc rheometer) Cure Test described by Pattison in U.S. Pat. No. 3,876,654 at a test temperature of 177° C. At a curing time of 30 minutes, the amount of torque increase is 138 cm.kg. This relatively great torque increase is unexpected and beneficially useful in many applications compared with that obtained in some of the more useful prior art curable fluoroelastomer compositions; a very rapid and high state of cure is indicated here.

The Shore Hardness (Durometer A) value of the composition is 92 when tested by ASTM Method D-676 on samples of the composition press-cured for 15 minutes at 190° C under a total pressure of 18150 kg., and post cured in an oven during a cycle of: 6 hours to reach 204° C, 18 hours at 204° C, 6 hours to reach 288° C and 18 hours at 288° C.

The compression set value of the composition is 50 when tested at 204° C for 70 hours by ASTM Method D-395-61 Method B, using as test samples pellets (1.27 cm. thick and 1.9 cm. in diameter) cured as described in the prior paragraph.

EXAMPLE 3

A curable fluoroelastomer is prepared, compounded and cured in the manner described in Example 2 except:

a. the monomer feed rate is adjusted so that a copolymer is obtained which contains 65.6 mole % tetrafluoroethylene units, 33.0 mole % perfluoromethyl perfluorovinyl ether units and 1.4 mole % bromotrifluoroethylene units. This copolymer has a bromine content of 0.9 weight % and an inherent viscosity (Example 1 method) of 0.35;

b. in preparing the curable composition, the amount of carbon black is 5 parts, the amount of magnesium oxide is 5 parts and the amount of peroxide curing agent is 5 parts; and c. test samples are press-cured for 30 minutes at 180° C and post-cured as in Example 2.

The compression set value of the cured Example 3 fluoroelastomer is 57 when tested as in Example 2. Tensile strength is 147 kg./cm.$^2$, elongation at break is 60% and set at break is 3% (ASTM D-412).

EXAMPLE 3A

For purposes of comparison, a fluoroelastomer outside the invention is prepared, compounded and cured in the manner described in Example 3 except the monomer feed rate is adjusted (the amount of bromotrifluoroethylene is increased) so that a copolymer is obtained whose bromine content is 7.2 weight % (equal to 11.4 mole % bromotrifluoroethylene units). The tetrafluoroethylene/ether ratio is kept at about 2/1 as in Example 3.

The cured Example 3A test samples are so brittle that one cannot obtain values for tensile strength, elongation and set at break.

EXAMPLE 4

A curable fluoroelastomer composition is prepared and cured in the manner described in Example 2 except the bromotrifluoroethylene is replaced with bromodifluoroethylene; and the monomer feed rate is adjusted to obtain a copolymer which contains 69.63 mole % tetrafluoroethylene units, 30.0 mole % perfluoromethyl perfluorovinyl ether units and 0.37 mole % bromodifluoroethylene units. This copolymer has a bromine content of 0.3 weight % and an inherent viscosity (Example 1 method) of 0.27.

In the ODR (oscillating disc rheometer) Cure Test described in Example 2, the torque increase is 46 cm.kg. at a curing time of 30 minutes. The composition has Shore A Hardness of 90, a compression set of 99 (Example 2 method), a tensile strength at break ($T_B$) of 194 kg./cm.$^2$, an elongation at break ($E_B$) of 140%, a modulus at 100% elongation ($M_{100}$ per ASTM°-412) of 147 kg./cm.$^2$ and a set at break of 19%.

EXAMPLE 5

A fluoroelastomer composition is prepared as described in Example 2 except the bromotrifluoroethylene is replaced with perfluoroallyl bromide; and the monomer feed rate is adjusted to obtain a copolymer which contains 69.2 mole % tetrafluoroethylene units, 30.0 mole % of perfluoromethyl perfluorovinyl ether units and 0.8 mole % of perfluoroallyl bromide units. This copolymer has a bromine content of 0.3 weight % and an inherent viscosity of 0.21.

In the ODR Cure Test, the torque increase at 30 minutes is 19.6 cm.kg. The composition has $T_B$ of 151 kg./cm.$^2$, an $E_B$ of 100%, an $M_{100}$ 151 kg./cm.$^2$ and a set at break of 13%.

EXAMPLE 6

A fluoroelastomer composition is prepared as described on Example 2 except the bromotrifluoroethylene is replaced with 3,3-difluoroallyl bromide; and the monomer feed rate is adjusted to obtain a copolymer which contains 66 mole % of tetrafluoroethylene units, 33 mole % of perfluoromethyl perfluorovinyl ether units and 1 mole % of units of said bromide. The copolymer has a bromine content of 0.7 weight %.

In the ODR Cure Test, the torque increase at 30 minutes is 23 cm.kg. The composition has a $T_B$ of 103 kg./cm.$^2$, an $E_B$ of 90% and a set at break of 8%.

EXAMPLE 7

A curable non-elastomeric fluoropolymer composition is prepared as follows: A copolymer which contains 97 mole % tetrafluoroethylene units and 3 mole % bromotrifluoroethylene units is made by (a) providing a 400 cc. shaker bomb containing 0.75 grams ammonium persulfate, 200 cc. of water, 0.15 gram of ammonium perfluoro-octanoate, 50 grams of tetrafluoroethylene and 3 grams of bromotrifluoroethylene; (b) heating the mixture in the bomb for 3 hours at 85° C, (c) cooling the mixture to 24° C, (d) venting the gas from the bomb, (e) using a Buchner funnel to filter the copolymer and wash it three times with water and (e) drying the copolymer in a vacuum oven for 14 hours at 70° C.

The copolymer is a white powder having a bromine content of 2.6 weight % and a melting point of 315°–320° C.

The curable composition is made by mixing the following in a ball-mill for three days at 25° C: 100 parts of the Example 7 copolymer, 4 parts of magnesium oxide, 2 parts of calcium oxide, 4 parts of triallyl isocyanurate and 5 parts of the peroxide curing agent of Example 2.

A sample of the resulting composition is compression molded while heated at 204° C for 1 hour. The resulting cured fluoropolymer plastic material does not melt heated well above 320° C, and shows no evidence of melting when it is heated in an open flame.

EXAMPLE 8

A fluoroelastomer of the present invention is prepared by repeating Example 1 except: The monomers fed to the reactor in the present Example are 56 parts vinylidene fluoride, 44 parts hexafluoropropylene and 0.8 part bromotrifluoroethylene; a two-liter reactor is used; the pressure in the reactor is 63 kg./cm.$^2$; the reaction mixture temperature is 105° C and the pH is 3.3; the reactor residence time is about 15 minutes; and operation (2) consists of feeding to the reactor (for each 100 parts of monomer) 400 parts water containing 0.3 part of ammonium persulfate and 0.05 part sodium hydroxide. The gas chromatograph of operation (3) can be omitted. The copolymer obtained, after 91% monomer conversion, contains 59.1% vinylidene fluoride units, 40% hexafluoropropylene units and 0.9% bromotrifluoroethylene units (weight %). The latex has a copolymer solids content of 18.7%.

The resulting fluoroelastomer has a Mooney viscosity of 94 at 100° C; this measure of bulk viscosity is determined on a Mooney viscometer using the large rotor and a ten-minute shearing time.

EXAMPLE 9

A curable fluoroelastomer composition is prepared by mixing the following on a two-roll rubber mill whose rolls are at about 25° C: 100 parts of the Example 8 copolymer, 15 parts of carbon black MT, 10 parts of finely pulverized butuminous coal ("Austin Black"), 1 part of calcium hydroxide, 2 parts calcium silicate ("Microcel E"), 4 parts of triallyl isocyanurate, and 4 parts of peroxide curing agent ("Luperco 101XL", which is understood to be 45% of 2,5-dimethyl-2,5-di(-tertiarybutylperoxy) hexane and 55% inert filler).

Test samples of the composition are press-cured for 30 minutes at 177° C and post-cured in an oven during a cycle of 4 hours to reach 260° C and 18 hours at 260° C.

The resulting cured fluoroelastomer has a compression set value of 27 (Example 2 method), a $T_B$ of 154 kg./cm.$^2$, an $E_B$ of 170% and an $M_{100}$ of 75.5 kg./cm.$^2$.

Example 10

Examples 8 and 9 are repeated except for the changes mentioned below.

The copolymer is prepared from 82 parts vinylidene fluoride, 67 parts hexafluoropropylene, 1.4 parts 4-bromo-3,3,4,4-tetrafluorobutene-1, and (for each 150 parts monomer) 600 parts of water containing 0.4 part of ammonium persulfate and 0.08 part of sodium hydroxide. The reaction mixture pH is 4.3, residence time is 20 minutes and the copolymer solids content of the latex is 18%.

The copolymer obtained, after 86% monomer conversion, contains 58.9% vinylidene fluoride units, 40% hexafluoropropylene units and 1.1% units of the bromine compound (weight %). The resulting fluoroelastomer has a Mooney viscosity of 100 (Example 8 method); and it has an inherent viscosity of 1.57 when measured at 30° C at a concentration of 0.1% by weight in a solvent composed of 87% by volume of tetrahydrofuran and 13% by volume of N,N-dimethyl formamide.

The curable fluoroelastomer composition is prepared by mixing on a rubber mill 100 parts of the Example 10 copolymer, 15 parts carbon black MT, 10 parts Austin Black, 1 part magnesium oxide, 3 parts dibasic lead phosphite, 3.3 parts of triallyl isocyanurate and 3.3 parts of the Example 9 peroxide curing agent.

The test samples, when cured as in Example 9, have a compression set value of 25, a $T_B$ of 144 kg./cm.$^2$, an $E_B$ of 185% and an $M_{100}$ of 59.6 kg./cm.$^2$.

When a fluoropolymer outside the invention is made, for purposes of comparison, in the substantially the same manner as in Example 10 except for the omission of the bromine compound, and the resulting copolymer of vinylidene fluoride and hexafluoropropylene is compounded and press-cured as in Example 10, a spongy non-useful product is obtained of the type described below in Example 13A. "Substantially the same" herein means the same or almost the same; thus, the procedure used is the same for all practical purposes.

EXAMPLE 11

A curable non-elastomeric fluoropolymer composition is prepared as follows: A copolymer which contains about 98% vinylidene fluoride units, 1.7% bromotrifluoroethylene units and a small amount of polymerized hexafluoropropylene units is made by repeating Example 8 except the copolymer is prepared by feeding to the reactor 100 parts vinylidene fluoride, 35 parts hexafluoropropylene, 1.6 parts bromotrifluoroethylene and (for each 100 parts vinylidene fluoride) 454 parts water containing 0.45 part ammonium persulfate, 0.09 part sodium hydroxide and 0.94 part ammonium perfluoro octanoate; the reactor pressure is 42 kg./cm.$^2$; residence time is 30 minutes; the hexafluoropropylene feed is discontinued after polymerization is well established and the reaction is allowed to continue in the absence of hexafluoropropylene for 75 minutes. The copolymer is dried in a vacuum oven for 14 hours at 70° C. It has a bromine content of 0.85 weight %.

The curable composition is made and cured in the manner described in Example 7 except for the use of the Example 11 copolymer instead of the Example 7 copolymer. The resulting cured fluoropolymer plastic material is much more resistant to being dissolved by N,N-dimethyl acetamide than polyvinylidene fluoride when immersed in the solvent for several hours at 24° C.

EXAMPLE 12

A fluoropolymer which is a rubbery plastic is prepared by repeating Example 8 except the copolymer is made from 69 parts vinylidene fluoride, 11 parts hexafluoropropylene, 19 parts tetrafluoroethylene and 1 part bromotrifluoroethylene, and (for each 100 parts of monomer) 400 parts water containing 0.85 part ammonium persulfate and 0.21 part sodium hydroxide. The reaction mixture pH is 4.6, residence time is 15 minutes and the latex copolymer solids content (after 96% monomer conversion) is 19.7%. The copolymer contains 70% vinylidene fluoride, 9% hexafluoropropylene, 20% tetrafluoroethylene and 1% bromotrifluoroethylene (weight %). The portion of the copolymer which dissolves (80%) has an inherent viscosity of 0.46 (method of Example 10).

A curable fluoropolymer composition is prepared by mixing the following in a ball mill for 2 days at 24° C: 100 parts of the Example 12 copolymer in the form of a fine powder, 5 parts magnesium oxide, 5 parts of the peroxide curing agent of Example 2, and a mixture of 4 parts of triallyl isocyanurate and 2 parts of calcium silicate.

A cured test pellet is formed by pressing a sample of the resulting composition for 30 minutes at 204° C under enough pressure to form a pellet. When the pellet is immersed for 3 days at 24° C in acetonitrile, it swells some and undergoes a weight gain of 100%. When a pellet formed in the same manner from the Example 12 copolymer (no additives) is given the same test, it undergoes considerable disintegration and a weight gain of 350%.

EXAMPLE 13

A fluoropolymer is prepared as described in Example 8 except the copolymer is made from 77 parts tetrafluoroethylene, 23 parts propylene, 1.1 part bromotrifluoroethylene and (for each 100 parts of monomer) 359 parts of water containing 2.87 parts of surfactant (a 33% aqueous solution of sodium lauryl sulfate), 1.65 parts ammonium persulfate and 1.08 parts sodium hydroxide. The reaction conditions: Pressure of 42 kg./cm.$^2$, temperature of 80° C, residence time of 3 hours and pH of 9.0. The latex copolymer solids content (after 87% monomer conversion) is 20.7%. The copolymer contains about 73.4% tetrafluoroethylene, 25.3% propylene and 1.3% bromotrifluoroethylene (by weight). It has a Mooney viscosity of 61 (Example 8 method).

A curable fluoropolymer composition is prepared by mixing the following on a two-roll rubber mill: 100 parts of the Example 13 copolymer, 30 parts carbon black MT, 4 parts magnesium oxide, 2 parts calcium oxide, 4 parts triallyl isocyanurate and 5 parts of the peroxide curing agent of Example 2.

Test samples of the composition are press-cured 30 minutes at 177° C and post-cured in an oven during a cycle of 4 hours to reach 130° C and 24 hours at 130° C.

The resulting fluoropolymer has a compression set value of 50 (o-rings tested 70 hours at 232° C, ASTM D-395), a $T_B$ of 63 kg./cm.$^2$, an $E_B$ of 200% and an $M_{100}$ of 28 kg./cm.$^2$.

EXAMPLE 13A

For purposes of comparison, a fluoropolymer outside the invention is made in substantially the same manner as in Example 13 except for the omission of the bromotrifluoroethylene; and the resulting copolymer of tetrafluoroethylene and propylene is compounded and press-cured as in Example 13. The samples removed from the press have a spongy structure. The composition has no utility for normal fluoropolymer applications. No meaningful test data of the type shown in Example 13 could be obtained on this material.

EXAMPLE 14

A fluoropolymer is prepared as described in Example 13 except the copolymer is made from 68 parts tetrafluoroethylene, 18.3 parts vinylidene fluoride, 13.1 parts propylene, 0.67 part bromotrifluoroethylene and (per 100 parts of monomer) 343 parts water containing 3.1 parts of the Example 13 surfactant, 1.96 parts ammonium persulfate and 1.37 parts sodium hydroxide. Residence time is 90 minutes. The latex copolymer solids content (after 67% monomer conversion) is 17.8%. The copolymer contains about 68.6% tetrafluoroethylene, 12.9% vinylidene fluoride, 17.5% propylene and 1.0% bromotrifluoroethylene.

A curable fluoropolymer composition is prepared in the manner described in Example 13 except the Example 14 copolymer is used. Test samples are cured as described in Example 13 except the post-cure temperature is 204° C.

The resulting cured fluoropolymer has a compression set value of 85 (Example 13 method), a $T_B$ of 80.4 kg./cm.$^2$, an $E_B$ of 140% and an $M_{100}$ of 45.6 kg./cm.$^2$.

EXAMPLE 14A

For purposes of comparison, a fluoropolymer outside the invention is made in substantially the same manner as in Example 14 except for the omission of the bromotrifluoroethylene; and the resulting copolymer of tetrafluoroethylene, vinylidene fluoride and propylene is compounded and press-cured as in Example 14. The non-useful results are as described in Example 13A.

EXAMPLE 15

A fluoropolymer is prepared in substantially the same manner as in Example 10 except the bromine compound used in that Example is replaced with 4-bromoperfluorobutene-1. This bromine compound can be made as follows: The diadduct of vinylidene and bromotrichloromethane is prepared according to German Pat. No. 949,822. Hydrolysis of the diadduct and conversion to the ethyl ester is carried out according to the procedure of Y. K. Kim, J. Org. Chem. 32,3673 (1967). Decarboxylation of the sodium salt of the ester gives 4-bromoperfluorobutene-1.

The resulting copolymer is compounded, cured and tested in substantially the same manner as described in Example 10. Useful results are obtained.

EXAMPLE 16

A fluoropolymer is prepared by repeating Example 8 except the copolymer is made from 46 parts vinylidene fluoride, 51 parts of hexafluoropropylene, 41 parts of tetrafluoroethylene, 1.2 parts bromotrifluoroethylene and (for each 140 parts monomer) 600 parts water containing 0.59 part ammonium persulfate and 0.15 part sodium hydroxide. The reaction mixture pH is 2.9, residence time is 20 minutes, and the latex copolymer solids content (after 91.2% monomer conversion) is 17.7%. The copolymer contains 36% vinylidene fluoride, 31% hexafluoropropylene, 32% tetrafluoroethylene and 1% bromotrifluoroethylene (weight % of polymerized units).

A curable fluoropolymer composition is prepared in the manner described in Example 10 except the Example 16 copolymer is used, the amount of triallylisocyanurate is 1.5 parts and the amount of Example 9 peroxide curing agent is 2 parts. Test samples are press-cured 15 minutes at 177° C and oven-cured 4 hours to reach 260° C and 18 hours at 260° C.

The resulting cured fluoropolymer has a compression set value of 24 (pellet, 232° C for 70 hours), a $T_B$ of 150 kg./cm.$^2$, an $E_B$ of 185% and an $M_{100}$ of 57.7 kg./cm.$^2$.

EXAMPLE 17

A fluoropolymer is prepared by repeating Example 8 except the copolymer is made from 55 parts vinylidene fluoride, 35 parts perfluoromethyl perfluorovinyl ether, 10 parts tetrafluoroethylene and 0.5 part vinyl bromide (added as a 16% by volume solution in trichlorotrifluoroethane) and, for each 100 parts of monomer, 400 parts water containing 0.6 part ammonium persulfate and 0.1 part sodium hydroxide. The reaction mixture pH is 3.3, residence time is 30 minutes, and the latex copolymer solids content, after 97.5% monomer conversion, is 20%. The copolymer contains 55% vinylidene fluoride, 34.5% perfluoromethyl perfluorovinyl ether, 10% tetrafluoroethylene and 0.5% vinyl bromide (weight % of copolymerized units). It has a Mooney viscosity of 32 (Example 8 method).

A curable fluoropolymer composition is prepared by mixing on a two-roll mill 100 parts of the Example 17 copolymer, 30 parts carbon black MT, 1 part magnesium oxide, 3 parts dibasic lead phosphite, 5 parts of the Example 9 peroxide curing agent and 4 parts triallyl isocyanurate. Test samples are press-cured 15 minutes at 177° C and oven-cured 4 hours to reach 260° C and 24 hours at 260° C. The resulting cured fluoropolymer has a compression set value of 66 (O-rings, 70 hours at 232° C), a $T_B$ of 105 kg./cm.$^2$ an $E_B$ of 165% and an $M_{100}$ of 54.2 kg./cm.$^2$).

When a fluoropolymer outside the invention is made, for purposes of comparison, in substantially the same manner as in Example 17 except for the omission of the vinyl bromide, and the resulting copolymer of vinylidene fluoride, perfluoromethyl perfluorovinyl ether and tetrafluoroethylene is compounded and press-cured for 15 minutes at 177° C, one obtains a spongy non-useful product of the type described in Example 13A.

We claim:
1. As a novel fluoropolymer, a copolymer whose interpolymerized units consist essentially of
   a. up to 3 mole %, based on the total moles of components (a) and (b), of units derived from a compound selected from the group: bromotrifluoroethylene and 4-bromo-3,3,4,4-tetrafluorobutene-1, with the proviso that enough of such units are present to provide at least 0.05 weight % bromine in the copolymer, and
   b. enough units derived from component (b-1), (b-2) or (b-3) as follows to make up the remainder of the copolymer:
      b-1. tetrafluoroethylene and a perfluoroalkyl perfluorovinyl ether wherein the alkyl group contains 1–5 carbon atoms,
      b-2. about 45–65 mole % of tetrafluoroethylene, about 20–55 mole % of a $C_2$–$C_4$ olefinic hydrocarbon and from 0 to about 30 mole % vinylidene fluoride, or
      b-3. vinylidene fluoride, at least one fluorine-containing olefin copolymerizable therewith, and optionally said perfluoroalkyl perfluorovinyl ether, said olefin being a compound which contains 2–7 carbon atoms, contains no bromine atom, and contains at least as many fluorine atoms as carbon atoms.
2. A copolymer according to claim 1 wherein component (b) is composed of units derived from about 50–80 mole % tetrafluoroethylene and about 20–50 mole % perfluoroalkyl perfluorovinyl ether.
3. A copolymer according to claim 2 wherein said ether is perfluoromethyl perfluorovinyl ether.
4. A copolymer according to claim 3 wherein component (a) is bromotrifluoroethylene.
5. A copolymer according to claim 1 wherein component (b) is composed of units derived from:
   vinylidene fluoride and hexafluoropropylene or pentafluoropropylene;
   vinylidene fluoride, tetrafluoroethylene and hexafluoropropylene or pentafluoropropylene; or
   vinylidene fluoride, said perfluoroalkyl perfluorovinyl ether, and at least one member of the group: hexafluoropropylene and tetrafluoroethylene.
6. A copolymer according to claim 5 wherein component (a) is bromotrifluoroethylene.
7. A copolymer according to claim 5 wherein component (b) is composed of units derived from about 30–70% vinylidene fluoride and about 30–70% hexafluoropropylene by weight of (b).
8. A copolymer according to claim 5 wherein component (b) is composed of units derived from about 25–70% vinylidene fluoride, about 19–60% hexafluoropropylene and about 3–35% tetrafluoroethylene by weight of (b).
9. A copolymer according to claim 1 wherein component (b) is composed of about 45–55 mole % of tetrafluoroethylene units and about 45–55 mole % of propylene units.
10. A copolymer according to claim 1 wherein component (b) is composed of about 50–65 mole % of tetrafluoroethylene units, about 5–26 mole % of vinylidene fluoride units and about 20–45 mole % of propylene units.
11. A copolymer according to claim 1 wherein enough component (a) units are present to provide about 0.3–1.5 weight % bromine in the copolymer.
12. A copolymer according to claim 1 wherein component (a) is 4-bromo-3,3,4,4-tetrafluorobutene-1.

* * * * *